May 22, 1928. 1,671,033
C. I. KIMURA
GAS AND ELECTRIC DRIVE FOR VEHICLES
Filed Dec. 22, 1925 3 Sheets-Sheet 1
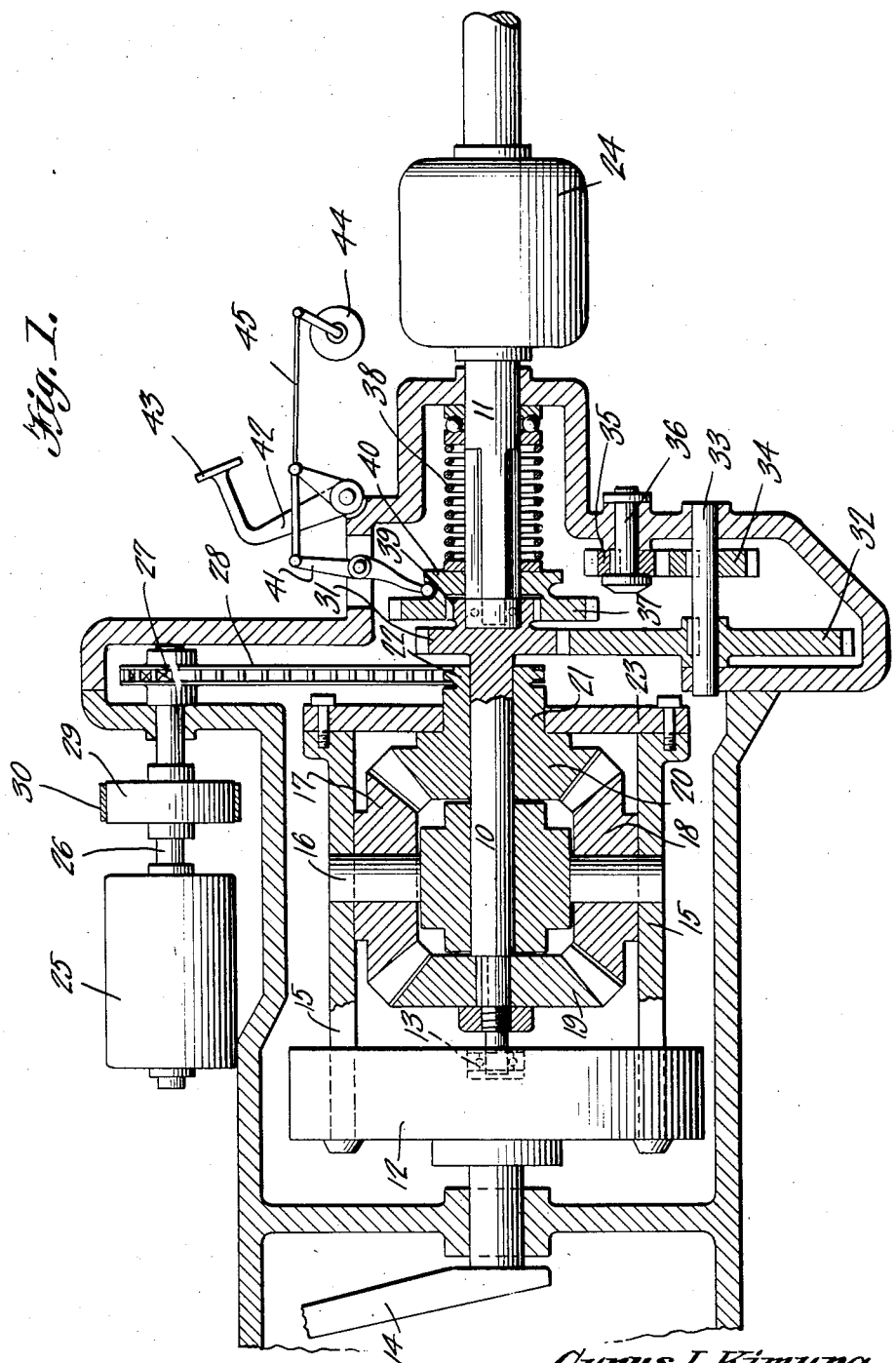

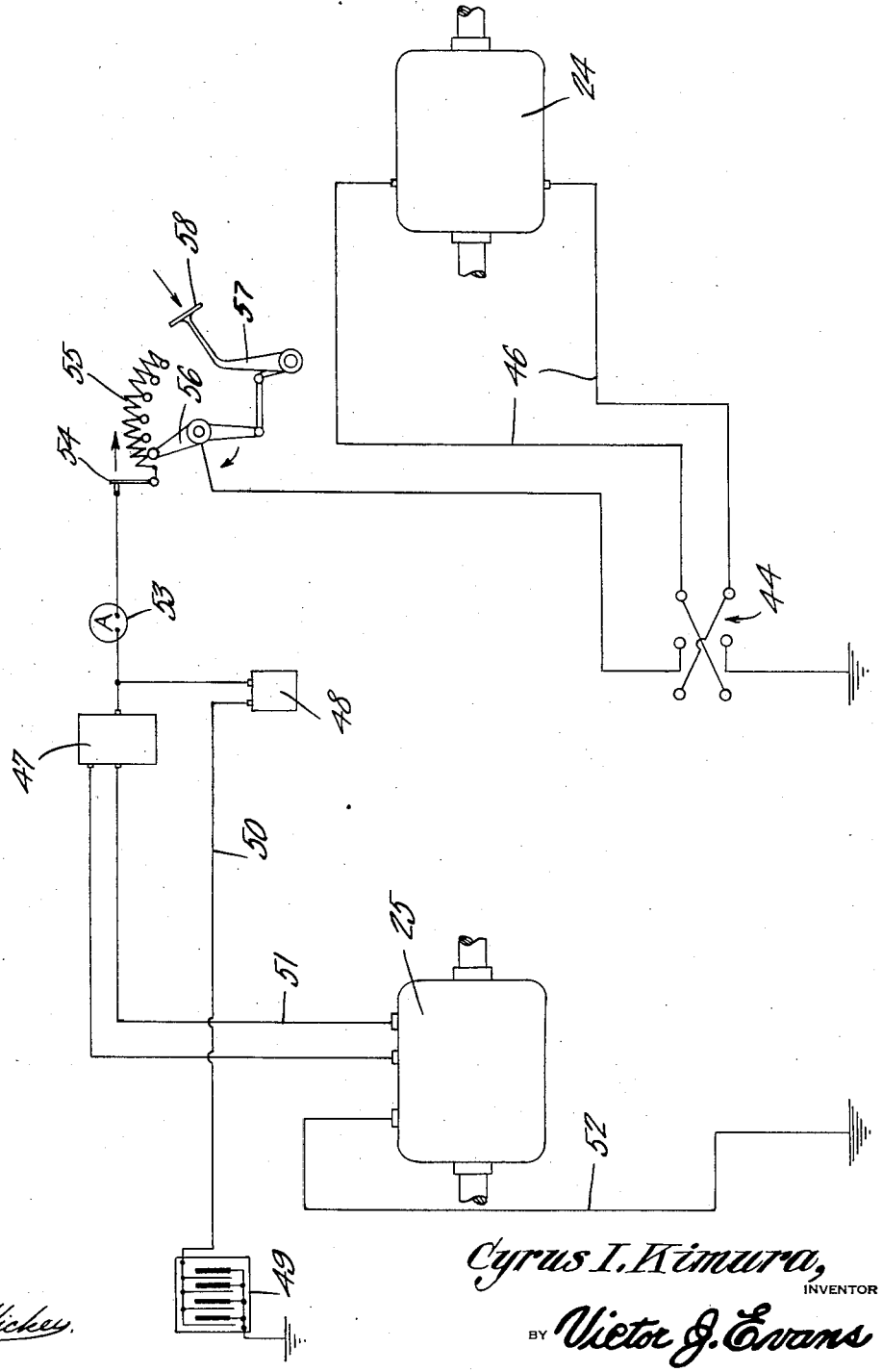

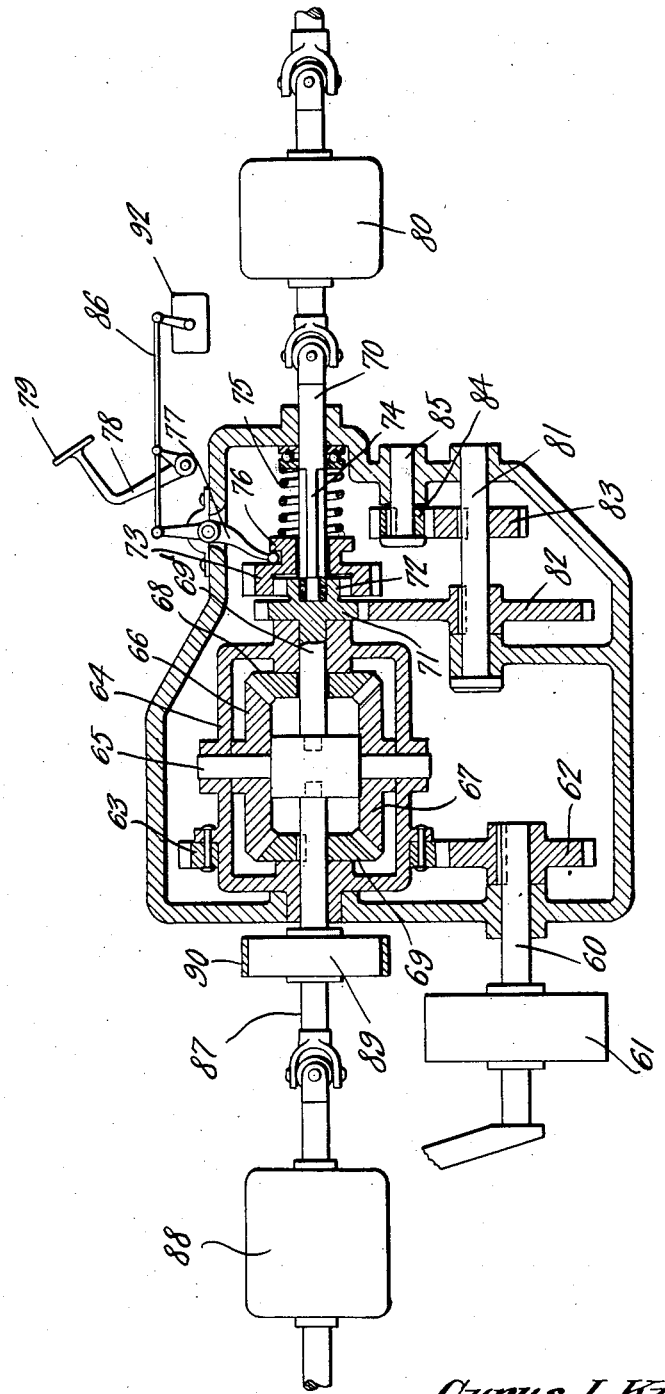

Patented May 22, 1928.

1,671,033

UNITED STATES PATENT OFFICE.

CYRUS I. KIMURA, OF CHICAGO, ILLINOIS.

GAS AND ELECTRIC DRIVE FOR VEHICLES.

Application filed December 22, 1925. Serial No. 77,142.

This invention relates to mechanism for propelling or operating wheeled vehicles, and while it is primarily intended for use in connection with automobiles, its general use or application is contemplated by the claims.

In carrying out the invention I contemplate the use of an internal combustion engine and electric motor, both of which under certain conditions cooperate to rotate the drive shaft, while at other times under different conditions the electric motor is used independently of the engine to operate a reverse mechanism.

Another object of the invention resides in the provision of a mechanism of this character, which requires no shifting for forward speed of the vehicle so equipped, and which develops no definite speed.

A further object of the invention resides in the use of a generator for the electric motor, operated so that when the speed of the car is decreased the speed of the generator is increased.

A still further object resides in the elimination of a clutch coupled with a smoother operation of the vehicle, and thereby increasing the life and usefulness of the machine.

Other objects and advantages will appear when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a sectional view through the mechanism forming the subject matter of the present invention.

Figure 2 is a diagrammatic view.

Figure 3 is a view similar to Figure 1 of a modified construction.

Referring to the drawings in detail, and more particularly to Figure 1, 10 and 11 indicate the sections of a drive shaft which are arranged in end to end relation, the shaft 10 being journaled in the fly wheel 12, as at 13. The fly wheel forms part of an internal combustion engine, the crank shaft of which is indicated at 14, the fly wheel being susceptible of rotation independently of the shaft section 10. Supports 15 for a spider 16 are fastened to the fly wheel 12 for rotation therewith, while grouped about the spider 16 is a plurality of beveled gears for a purpose to be hereinafter described. Planetary gears 17 and 18, respectively, are arranged upon the spider directly opposite each other, while positioned between and meshing with these planetary gears are the gears 19 and 20, respectively. The gear 19 is keyed to the drive shaft section 10, while the gear 20 rotates on said shaft and includes a hub portion 21 provided with a small sprocket wheel 22. The hub 21 rotates in a suitable support 23. An electric motor indicated at 24 is arranged upon the section 11 of the drive shaft for rotating the latter in unison with the section 10 of said shaft, and also independently thereof in a counter-clockwise direction to operate a reversing mechanism to be hereinafter described, when the use of such mechanism is desired. A generator 25 is electrically connected with the motor to supply the latter with current, the generator including a shaft 26 equipped with a sprocket wheel 27, over which and the sprocket wheel 22 above referred to is trained an endless chain 28. Manifestly, the generator is operated from the gear 20, so that the shaft section 11 can be rotated to operate the reverse mechanism without interfering or changing the direction of rotation of the crank shaft of the engine or the generator shaft 26. This shaft 26 is provided with a brake drum 29 and a brake band 30, which are used for emergency purposes, as applying the brake, the power of the engine will be transmitted to the drive shaft and wheels of the car directly.

The shaft section 10 is provided with a gear 31 which meshes with a large reversing gear 32 keyed upon a shaft 33 while also keyed upon the same shaft is a smaller gear 34 meshing with a similar gear 35 keyed upon a shaft 36. These gears form part of the reversing mechanism above referred to, which also includes a gear 37 mounted for sliding movement upon the squared portion of the drive shaft section 10, and normally held in the position shown in Figure 1 by means of a coiled spring 38. This gear 37 is adapted to have interlocking association with a dog gear 39, and is provided with the usual grooved collar 40 to accommodate the adjacent end of the lever 41 for controlling the movements of the gear 37 longitudinally of the shaft section 11. The lever 41 is connected with the shank 42 of a foot pedal 43, as clearly shown in Figure 1, so that when the pedal is depressed the gear 37 is moved longitudinally of the shaft section 11 against the tension of the spring 38, until it engages the gear 35, whereupon a reverse mechanism is put into use for reversing the direction of rotation of the drive shaft section 11.

As shown in Figure 2, the motor 24 is connected in circuit with a reversing switch of any suitable character indicated generally at 44, and which switch is operated by means of a rod 45 connected with the shank of the pedal 43, the current flowing to and from the motor from the switch 44 through the wires 46. The switch 44 is grounded as illustrated. The generator 25 is also connected in circuit with a voltage controller 47 and an automatic cut-out switch 48 for the battery indicated at 49. The current flows from the battery through the wire 50, a switch 48 through the voltage controller and wire 51 to the generator, from where it is grounded through the wire 52. An ammeter is indicated at 53 and a control switch for the circuit indicated at 54 which is connected with a rheostat 55. The movable element 56 of the rheostat is actuated from the shank 57 of a foot pedal 58.

When the car is standing, and the internal combustion engine in operation, running at any speed, the spider supports 15 which are connected directly with the fly wheel 12 rotate the spider 16 with the planetary gears 17 and 18, respectively. These gears under these conditions rotate around the gear 19 and drive or rotate the gear 20, and inasmuch as this gear is utilized to operate the generator 25, the latter is maintained in operation as long as the gear 20 is in motion. The gear 19 will not rotate when the car is standing, and the engine in operation, because the weight of the car holds it stationary, the friction being greater than the gear 20. Consequently, the engine can operate without transmitting motion to the vehicle equipped with said mechanism, and when it is desired to put the vehicle in motion it is only necessary to depress the foot pedal 58 subsequent to the closing of the switch 54. Then by gradually releasing the pedal 58, which operates the rheostat the speed of the vehicle can be varied, electric current flowing from the battery through the generator to the motor 24, the latter cooperating with the combustion engine through the friction of the gears 17, 18, 19 and 20, respectively, to drive the wheels of the vehicle. As soon as the speed of the vehicle is increased with an increase of speed of the internal combustion engine, the gears 17, 18, 19 and 20, respectively, revolve as a unit with the spider supports 15, and will be driven by the engine, at the same time the generator which remains in operation supplies electric current to the electric motor to drive the rear wheels of the vehicle. The construction and operation are such that the internal combustion engine can be operated independently from the speed of the vehicle, and as the speed of the car is decreased the speed of the electric generator is increased. Furthermore, there is no definite speed with which the vehicle can be operated.

When it is desired to reverse the vehicle the pedal 43 is depressed, thereby disengaging the gear 37 from the dog gear 39, sliding the gear 37 into engagement with the adjacent gear 35 of the reversing mechanism above described. Incident to the depression of the pedal 43 the reverse switch 44 is automatically operated, thereby rotating the motor 24 in an opposite direction, and independently of the direction of rotation of the engine operated shaft section 10.

In Figure 3 I have shown a modified construction, wherein the power shaft is indicated at 60 and provided with a fly wheel 61. Keyed or otherwise suitably secured to this shaft is a gear 62 which meshes with a ring gear 63 carried by a housing 64, the latter constituting a support for the spider 65 and the gears grouped about the latter. Mounted on this spider to revolve freely thereabout are gears 66 and 67, respectively, the latter meshing with the gears 68 and 69, respectively. The gear 68 is mounted upon the section 69' of the drive shaft which is arranged in end to end relation with the section 70, as shown. The shaft 69' is equipped with a gear 71 and a dog gear 72 with which the gear 73 is associated, and normally arranged in the position shown in Figure 3. This gear 73 is mounted for sliding movement upon the squared portion 74 of the section 70 of the drive shaft, and is normally maintained in the position shown in Figure 3 by means of a coiled spring 75. The gear 73 is formed with a collar 76 to accommodate a shift lever 77, the lever being operated from the shank 78 of a foot pedal 79. This gear 73 is utilized to operate the reverse mechanism for the vehicle, to rotate the section 70 of the drive shaft in a direction opposite the direction of rotation of the section 69 of said shaft, by means of an electric motor 80. Arranged beneath and parallel with the section 70 of the drive shaft is a shaft 81 which has keyed or otherwise secured thereto a large reversing gear 82 and a smaller gear 83. This last mentioned gear meshes with a gear 84 keyed upon a stub shaft 85, and when the pedal 79 is depressed to slide the gear 73 against the tension of the spring 75, the said gear 73 is moved into engagement with the adjacent gear 84, operating the reversing mechanism for the purpose above mentioned. The motor 80 is connected in circuit with a reversing switch the same as shown and described in connection with Figure 2 of the drawings, and when the pedal 79 is depressed the reversing gear is simultaneously operated by means of a rod 86 connecting the said switch with the lever 77. Arranged in axial alinement with the drive shaft is a generator shaft 87, the generator being indicated at 88 and connected in circuit in the same manner shown and described in Figure 2. Supported upon the shaft 87 is a brake drum 89 and a brake band 90 which are used in emergency cases to retard and check the rotation of the drive shaft and rear wheels of the vehicle so equipped.

When the vehicle is standing still, and the internal combustion engine in operation, the engine shaft 66 rotates the gear 62, and as this gear meshes with the ring gear 63 carried by the housing 64, the latter, together with the spider 65, is rotated. This causes the gears 66 and 67 to rotate around the gear 68, but rotates the gear 69 to operate the generator 88. Consequently, the generator 88 is always operated while the internal combustion engine is in use, but the gear 68 will not revolve under these circumstances, because the weight of the car holds it, and the friction of the gears plus the weight of the car is sufficient for this purpose. When it is desired to put the car in motion the foot pedal 58 shown in Figure 2 is depressed and the electric switch 54 actuated to close the circuit, and the speed of the car regulated by the pedal 58. This causes the generator to supply the motor 80 with current to assist the internal combustion engine in propelling the vehicle. As soon as the speed of the car is increased to the speed of the engine, the gears 66, 67, 68 and 69, respectively, revolve as a unit with the housing 64, being thus operated by the engine, while the electric motor is also in operation to propel the vehicle. To reverse the vehicle it is only necessary to depress the pedal 79 to slide the gear 73 out of engagement from the dog gear 72 and into engagement with the adjacent gear 84 of the reversing mechanism. As above stated, the reversing switch 92 is operated at this time from the shift lever 77, so that the shaft section 70 is rotated in the direction opposite the direction of rotation of the engine shaft and generator, thus reversing the vehicle without interfering with either the generator or the said engine.

While it is believed that from the foregoing description the nature and advantages of the invention will be readily apparent, I desire to have it understood that I do not limit myself to what is herein shown and described and that such changes may be made when desired as fall within the scope of what is claimed.

Having thus described the invention, what is claimed as new, is:—

1. In combination, an internal combustion engine including a fly wheel, a spider supported by said wheel, a sectional drive shaft having its adjacent ends associated to permit of independent rotation in reverse directions, one of said sections having its adjacent end journaled in said fly wheel, planetary gearing supported by said spider and the last mentioned section of the shaft, an electric motor for operating the other mentioned section, a sliding gear mounted on said section, means for sliding said gear in one direction, and reversing mechanism operated by said gear in its adjusted position.

2. In combination, an internal combustion engine including a fly wheel, a spider supported by said wheel, a sectional drive shaft having its adjacent ends associated to permit of independent rotation in reverse directions, one of said sections having its adjacent end journaled in said fly wheel, planetary gearing supported by said spider and the last mentioned section of the shaft, an electric circuit including a motor for operating the other mentioned shaft, a rheostat arranged in said circuit and including a foot controlled movable element, a sliding gear mounted on the last mentioned shaft section, means for sliding said gear in one direction, reversing mechanism operated by said gear in its adjusted position, a generator including a shaft and a chain drive for operating the generator from the first mentioned section of the shaft.

In testimony whereof I affix my signature.

CYRUS I. KIMURA.